United States Patent [19]

Tomkinson

[11] Patent Number: 4,735,430
[45] Date of Patent: Apr. 5, 1988

[54] RACING BICYCLE HAVING A CONTINUOUSLY VARIABLE TRACTION DRIVE

[76] Inventor: Philip Tomkinson, 1810 Cedar Hill Dr., Birmingham, Mich. 48010

[21] Appl. No.: 86,179

[22] Filed: Aug. 14, 1987

Related U.S. Application Data

[63] Continuation of Ser. No. 909,686, Sep. 22, 1986, abandoned, which is a continuation-in-part of Ser. No. 670,168, Nov. 13, 1984, Pat. No. 4,647,060.

[51] Int. Cl.$^4$ ............................................. B62M 1/04
[52] U.S. Cl. ................................. 280/236; 280/238; 280/260; 74/200
[58] Field of Search ............ 280/236, 238, 260; 74/200, 201

[56] References Cited

U.S. PATENT DOCUMENTS

| | | | |
|---|---|---|---|
| 294,641 | 3/1884 | Latta | 280/238 |
| 1,798,384 | 3/1931 | Roberts | 280/260 |
| 2,084,703 | 6/1937 | Pinaud | 74/200 |
| 2,123,006 | 7/1938 | Hayes | 74/200 |
| 2,157,065 | 5/1939 | Madle | 74/200 |
| 2,239,087 | 4/1941 | Erban | 74/208 |
| 2,392,250 | 1/1946 | Lucas | 74/280 |
| 2,716,357 | 8/1955 | Rennerfelt | 74/200 |
| 2,795,970 | 6/1957 | Kollmann et al. | 74/750 |
| 3,023,643 | 3/1962 | Weber | 74/796 |
| 3,173,312 | 3/1965 | Stockton | 74/796 |
| 3,246,531 | 4/1966 | Kashihara | 74/200 |
| 3,357,277 | 12/1967 | Alsch | 74/796 |
| 3,372,608 | 3/1968 | Gleasman | 280/238 |
| 3,420,122 | 1/1969 | Okabe | 74/796 |
| 3,439,563 | 4/1969 | Petty | 74/810 |
| 3,822,610 | 7/1974 | Erban | 74/691 |
| 3,934,492 | 1/1976 | Timbs | 74/740 |
| 3,934,493 | 1/1976 | Hillyer | 74/750 B |
| 4,158,317 | 6/1979 | James | 74/796 |

Primary Examiner—John J. Love
Assistant Examiner—Donn McGiehan
Attorney, Agent, or Firm—Robert F. Hess

[57] ABSTRACT

A low-drag bicycle comprising an elongated, two piece, generally tubular frame of elliptical cross-section extending between the front and rear wheels wherein the cyclist assumes a recumbent position over the frame facing down and powers the cycle by means of a pedal arrangement directly connected to and concentrically arranged with the rear wheel axle, which axle constitutes the input shaft of a continuously variable compound traction drive transmission for driving the rear wheel hub.

20 Claims, 6 Drawing Sheets

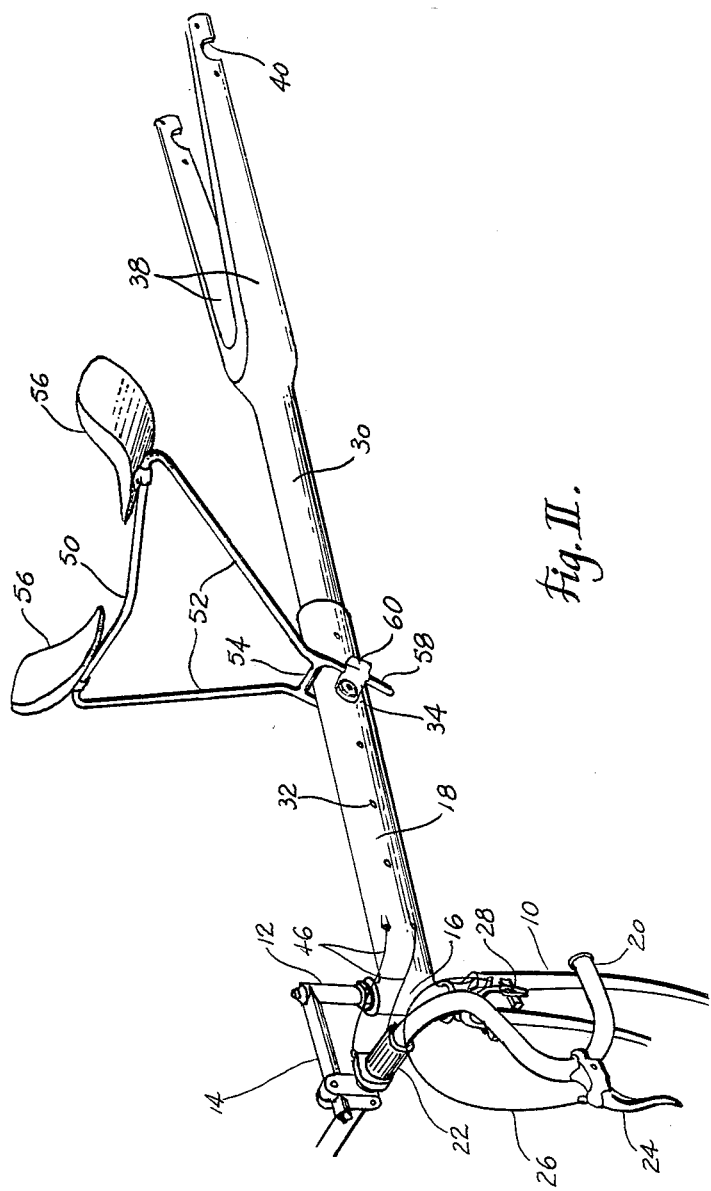

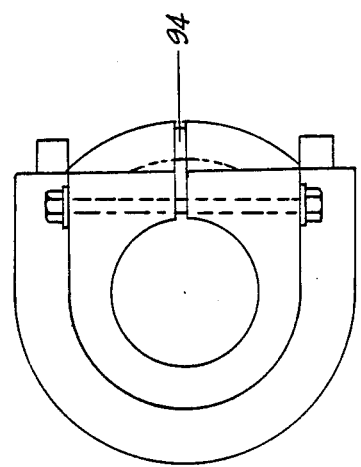
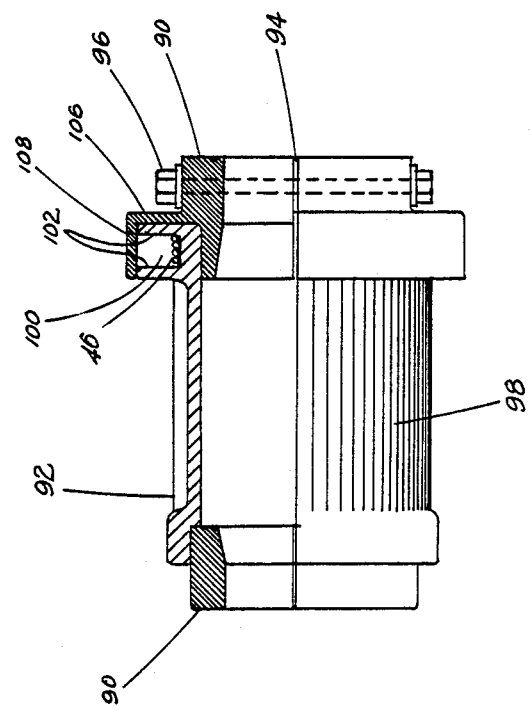

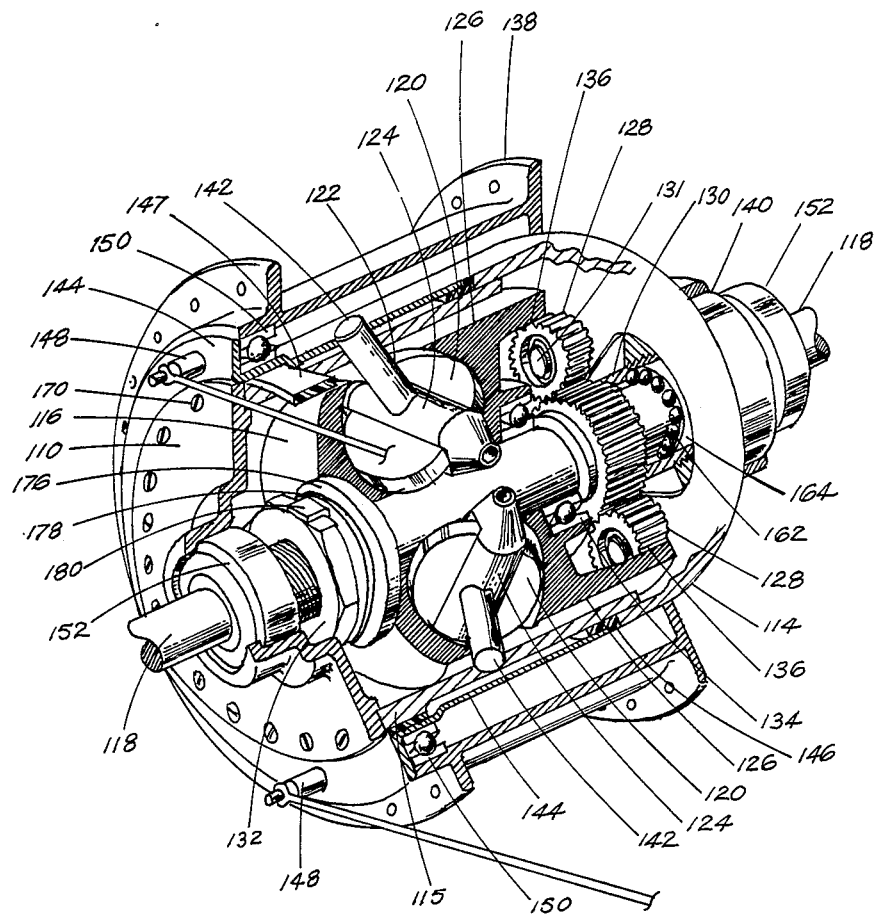
Fig. V.

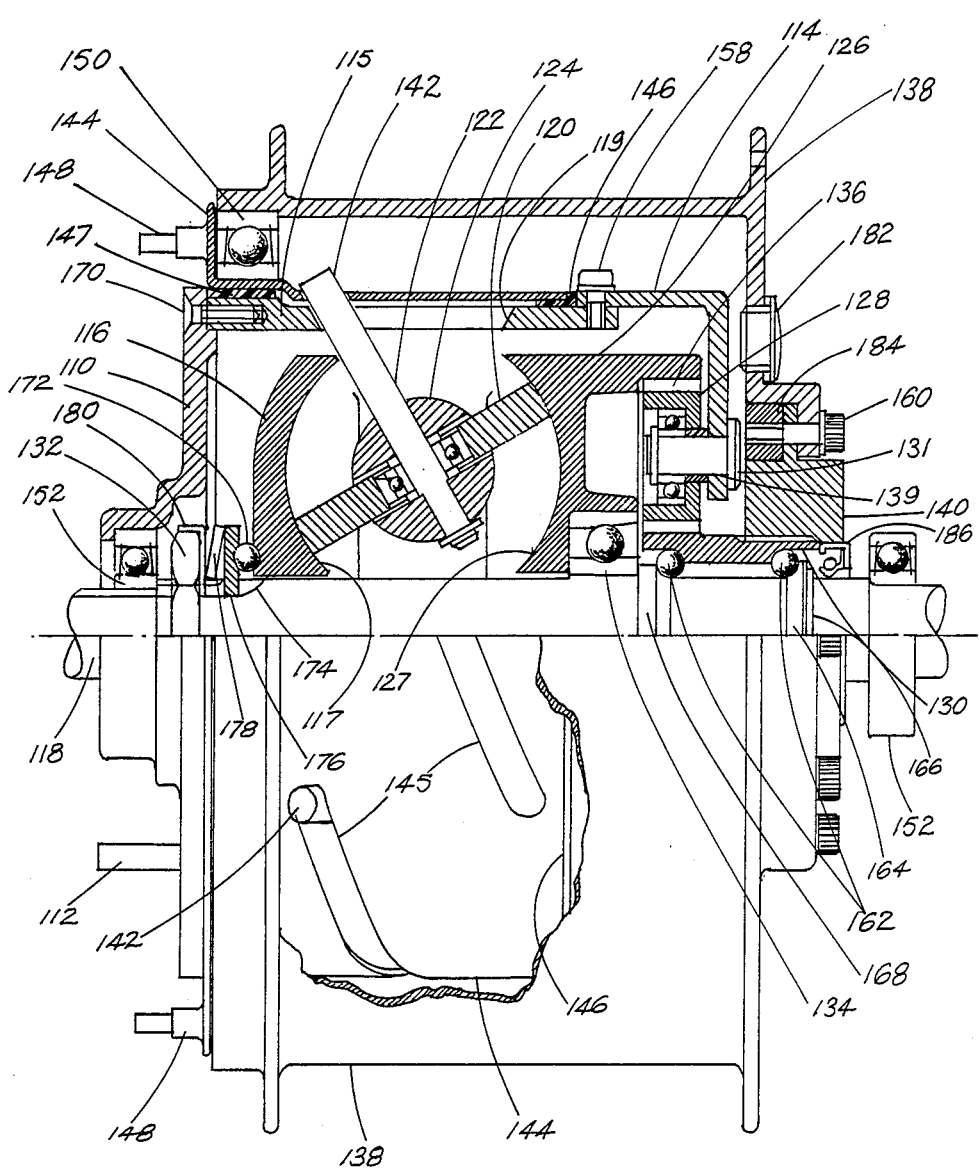
Fig. VI

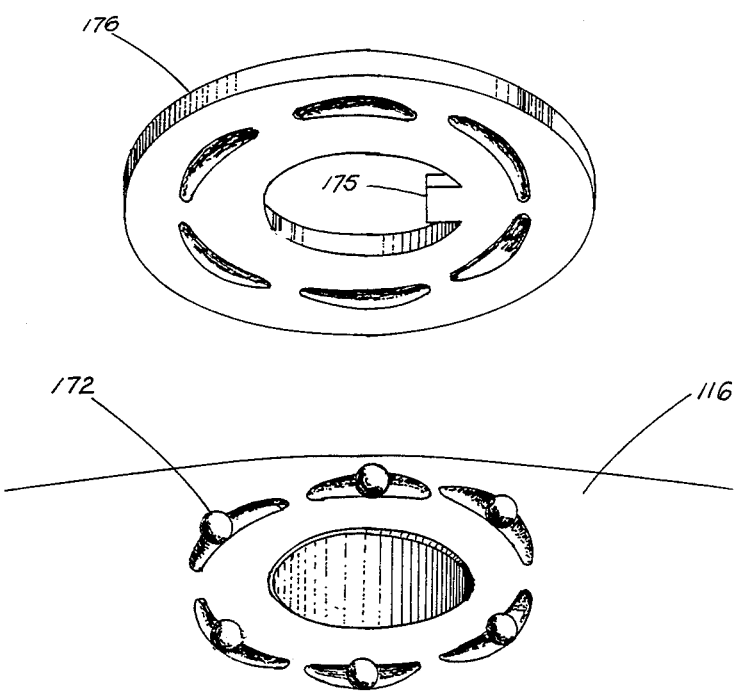
Fig. VII
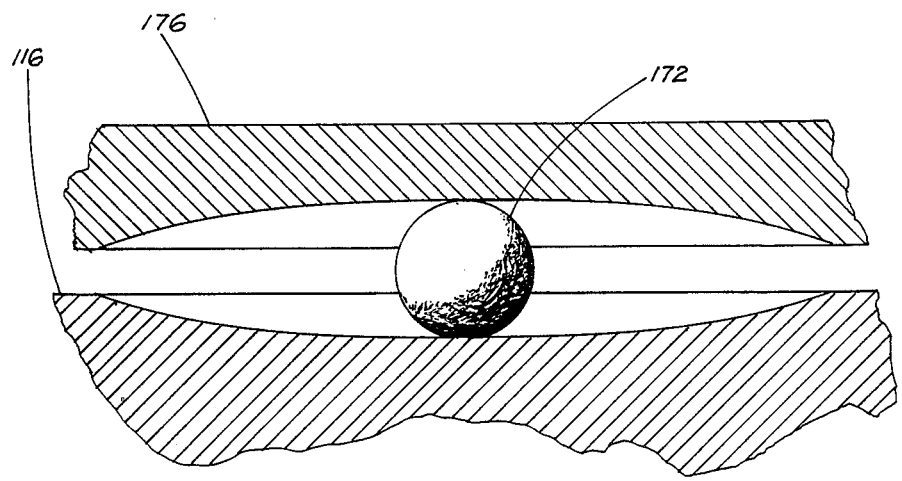
Fig. VIII

RACING BICYCLE HAVING A CONTINUOUSLY VARIABLE TRACTION DRIVE This application is a continuation of Ser. No. 909,686 abandoned which is a continuation-in-part of application Ser. No. 670,168, filed Nov. 13, 1984 and now U.S. Pat. No. 4,647,060, the subject matter thereof being incorporated herein by reference and made a part of this application.

FIELD OF THE INVENTION

This invention is related to human powered vehicles, and more particularly to racing bicycles and the mechanism for transmitting power to and changing the speed ratio of the drive wheel.

BACKGROUND OF THE INVENTION

The basic design of the bicycle has remained unchanged for several decades. Even racing bicycles, in spite of weight reductions and significant improvements in equipment, remain derivative of the old "sit-up and beg" machines used for anything from shopping to cross country cycling. These bicycles typically include the classic diamond frame with front and rear wheels, the rear wheel being driven by a pedal crank located intermediate the front and rear wheels and a chain drive connected to a rear axle mechanism, generally having a multispeed derailleur device located at the rear wheel for changing speeds. A major cause of both friction losses and distortion in the traditional frame lies in the use of such a remote chain wheel and sprocket system transmitting power from the bottom bracket of the frame to the rear wheel. Further, with such a traditional design the center of effort (the pedal crank axis) located ahead of the rear wheel, results in both the imposition of torsional stresses on the frame and in the fact that on the downward stroke the force which the rider can apply is limited to a little more than his or her weight unless a much greater and less easily sustainable effort is applied through the handlebars and the rider's body. Another fact of the traditional bicycle is that the rider presents a large frontal area to the air, causing a significant effort to be expended in overcoming wind resistance. Even in the racing "crouch" position, this effort is considerable.

It is to these basic concepts of the traditional bicycle that the present invention is directed. In the present invention, each of the above stated problems have been solved in a novel and elegant manner to provide an efficient and practical human-powered vehicle capable of achieving relatively high speeds in a far more efficient manner with less cyclist fatigue than heretofore known.

Further, improvements in materials technology and increased understanding of the hydrodynamic behavior of fluids has, in recent years, led to increased interest and application of traction (or gearless) drive systems. Such systems offer high efficiency, smooth power transmission, quietness and enhanced reliability together with the almost unique characteristic of permitting continuous variation in the speed ratio.

SUMMARY OF THE PRESENT INVENTION

The present invention provides a novel low-drag bicycle. In the present invention, an elongated, two piece, generally tubular frame of elliptical cross-section extends between the front and rear wheels. A cyclist assumes a recumbent position over the frame facing down. The bicycle is steered by means of the front wheel, while the cyclist powers the cycle by means of a pedal arrangement directly connected to and concentrically arranged with the rear wheel axle. The overall design is a radical departure from the traditional cycle and includes a repositioning of the major driving components, including the "engine", namely the rider, for maximum efficiency in the transmission of power to the driven wheel; elimination of torsional stresses in the frame; reduction in weight; simplification of the design and construction; and reduction in wind resistance. As such, my design is likely to be of more interest to the racing or sports enthusiast and, although it is unlikely to be used for shopping, certain of the ideas herein described could be applied to more conventional cycling machines. In further explanation, the pedal cranks are mounted on the same axis as the rear wheel, driving through a specially designed light weight transmission integral with the rear wheel hub. The design aligns the principle forces both to eliminate periphral frame distortions while positioning the rider's body such that consistently high and sustainable effort can be applied to the pedals. Thus chainwheel, chain, sprockets and the typical gear-change device are completely eliminated. While the continuously variable compound traction-drive transmission herein described was designed specifically with the aforementioned design in mind, its advantages could be readily applied to a conventional bicycle (or other machine) where the power is applied externally.

Further my design places the rider's body in a position akin to that of the swimmer which, in addition to lowering wind resistance, places the rider in a more comfortable position than the racing "crouch" and significantly reduces back strain.

DESCRIPTION OF THE DRAWINGS

The features and advantages of the present invention will become more clear upon reading the following Description of the Preferred Embodiment in conjunction with the accompanying drawings, of which:

FIG. I is a side view of the bicycle of my invention,

Figure 1:
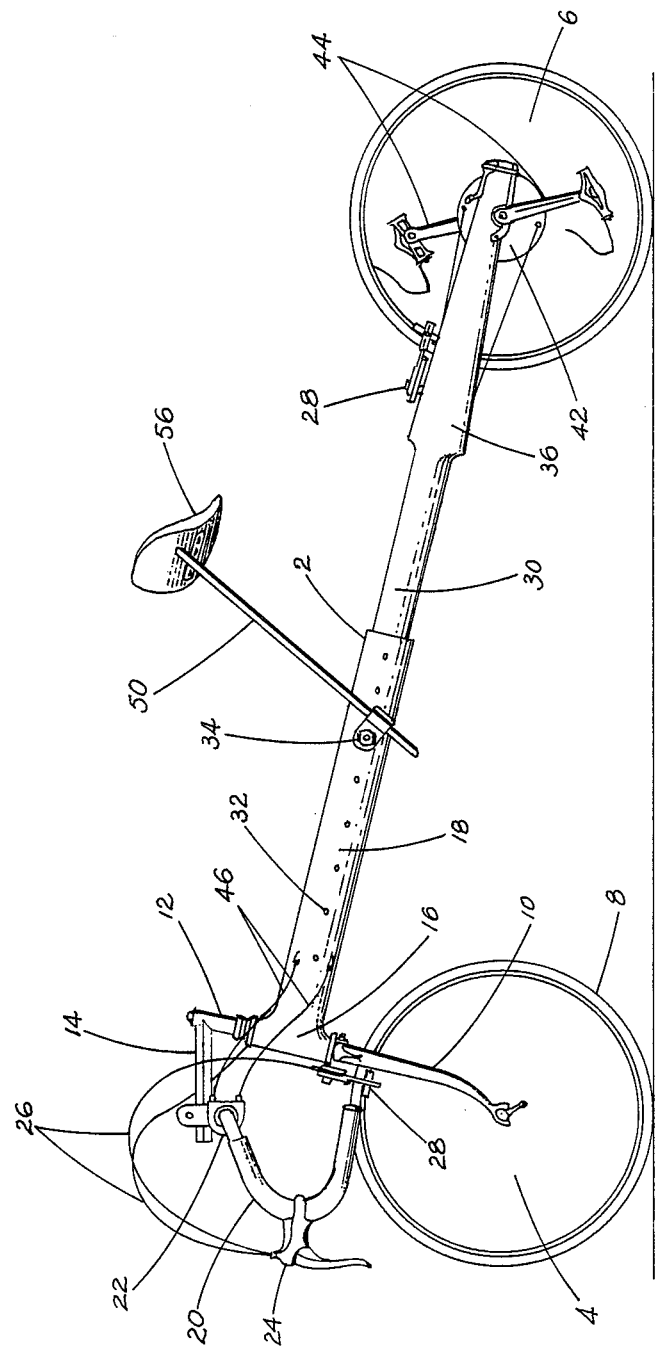

FIG. II is a partial perspective view of the bicycle showing details of the steering and front fork assemblies and the cyclist support means of my invention, FIGS. III and IV are a partial cross sectional side view and an end view, respectively, showing the details of a handlebar mounted speed changer in accordance with my present invention.

FIG. V is a partial cross sectional perspective view of the traction drive transmission device of my present invention.

FIG. VI is a partial cross sectional side view of the traction transmission device of my present invention.

FIG. VII is an exploded perspective view of a portion of the traction transmission device of my present invention.

FIG. VIII is a cross-sectional view of a portion of the traction transmission device of my present invention.

DESCRIPTION OF THE PREFERRED EMBODIMENT

Referring to FIG. I there is shown a drawing of the preferred embodiment of the present invention which illustrates the mechanical arrangement of the bicycle. The structural components include a frame 2 located between a front wheel assembly 4 and a rear wheel assembly 6. The bicycle is steered by the front wheel 8 which is conventionally mounted by means of front forks 10 which are attached to a steering post 12. The steering post 12 including axial front extension member 14 is pivotally mounted in ball bearings in the conventional manner within a sleeve portion 16. The sleeve portion 16 constitutes an integral part of the front frame member 18, however it could be a separate sleeve attached to the front member. The bicycle is steered by handlebars 20 adjustably attached to the axial front extension 14 of the steering post. Handlebars 20 are the conventionally shaped racing type. Attached thereto are the gear shift and brake controls 22, 24, respectively. The brake control system is standard and forms no part of this invention. It includes the usual brake actuating means 24 mounted directly to the handlebar on each side, one for the front wheel assembly and one for the rear. Extending therefrom are brake cables 26 which are connected with the usual front and rear brakes 28. The gear shift or speed changer 22 is a unique design and forms part of this invention. Its details are explained later. The front wheel is typically 20 to 27 inches in diameter, and the angle of the front forks is approximately 75° degrees in the described embodiment. This angle has been found to provide a suitable compromise between low speed handling and high speed stability, although other angles may be used. Thus far, I have described conventional components of a cycling mechanism. Hereafter, the description is unique to my invention.

As shown in FIGS. I and II, the frame 2 is basically of two piece design, constituting a front frame member 18 and a rear frame member 30. The front frame member 18 includes a sleeve portion 16, as described earlier, and is tubular and elliptical in cross section and designed to receive a similarly elliptical and telescopic portion of rear frame member 30. Front frame member 18 includes a series of axially, generally evenly spaced, holes 32, at least one of which will align with similar holes in the telescoping forward portion of the rear frame member. These two frame members are then locked to one another by means of a pin 34 or other suitable arrangement. This same pin 34 forms a part of the cyclist support means as described later. The rear frame member includes a rear wheel fork assembly 36 having two transversely spaced forks 38, as best seen in FIG. II. Each fork includes a rear wheel axle bearing upper seat 40. The rear wheel assembly includes a basically conventional bicycle wheel having the usual tires, spokes and rim (not numbered). However the hub 42 is not standard. Hub 42, which includes the rear wheel axle (not shown), is also the drive crank. As such it includes pedal crank members 44 which are directly attached to the axle. The hub includes a transmission. This transmission can be a simple fixed ratio drive without free-wheel, such as is specified for track racing. However, in my preferred embodiment the transmission is of a type having a continuously variable speed over a set speed range, the speed range being set by the sizing or structural relationship of the drive and driven components. Thus, the pedal crank 44 is connected to the rear wheel axle and constitutes the input to the transmission. The transmission output is a part of the hub itself as connected to the wheel and spoke assembly. The speed, within the selected speed range, is continuously and infinitely varied at will by the cyclist by means of speed changer 22 as previously described in general and a speed changing cable 46, the ends of which extend to the transmission assembly.

The rider support for my cycle includes a V shaped frame 50 having two legs 52 diverging radially outwardly from one another beginning at a transversely arranged rest 54. At the upper portion of the V shaped frame member there is mounted on each leg a hip pad 56. These pads, whose transverse and angular position can be adjusted for individual comfort, are securely fastened to the V shaped frame. At the other end of the V shape frame and extending downwardly from the rest 54 are spaced parallel frame portions 58. These portions provide the means for adjusting the position of the seat so as to accommodate any desired height and are clamped to the bicycle frame by means of a bifercated clamp 60, one on each side of the frame, and each held together by means of the same pin 34 which fixes the front and rear frame members 18, 30 to one another. While I have shown the frame to frame clamp and the rider support clamp to be one and the same member, this is by no means required. Obviously the frame member could be a single tubular member, or it could have a means separate from the seat clamp for securing two frame members together. Each of the hip pads are preferrably made of foam rubber mounted on a steel backing and covered with a suitable fabric, with the steel backing being bent to curvlinear shape designed to fit the body shape of most riders.

Referring now to FIGS. III and IV, there is shown a unique speed changing mechanism designed to be clamped to the front handlebars as earlier mentioned. This speed changing mechanism 22 has three basic components, namely two split tubular clamp body portions 90 and a rotatable barrel 92 concentrically arranged around the tubular clamp body portions. The purpose of the clamp body portion is simply to allow means for clamping the speed changing mechanism to the handlebars and to permit its assembly over the curved portion of typical racing handlebars. To this end the ends 94 of the split body portion members are drawn together around the handlebar by means of a nut and bolt type fastener 96 or other suitable means. Concentrically arranged around this clamp body portion is the rotatable barrel 92 which is in close fitting but sliding engagement therewith. It includes a grooved outer hand grip portion 98 and a shrouded channel portion 100. The channel portion is defined by two radially extending side walls 102 spaced from one another sufficient to allow cable 46 to be coiled there within. To prevent rain and dirt from getting into this groove or channel 100 I have provided the clamp body portions 90 with a shroud which includes a radially outwardly extending wall 106 and an axially extending wall 108 which extends towards the hand grip portion sufficiently to completely overlap the channel 100. By rotating the barrel with one's hand, a respective one of the two ends (depending on whether rotation is clockwise or counterclockwise) of the speed changing cable 46 is pulled forward thus changing the position of the speed changer 144 which resides within the rear wheel hub 42 as described below.

In FIGS. V–VIII there is shown the details of the continuously and infinitedly variable traction drive mechanism for transmitting power from the pedal crank assembly 44 to the drive rear wheel assembly 6. Referring principally to FIGS. V and VI, the hardened and ground input shaft which is part of the pedal crank members 44 is carried on sealed ball bearings 152 housed directly in the upper seat 40 of frame 2. The cast aluminum cover plate 110 is also rigidly mounted to forks 38 of frame 2 by means of the lug 112 in order to inhibit rotation of the cage or main body 115. Torque is transmitted from the pedals through the input shaft 118 which embodies a keyway 174 in which the tang 175 of pressure plate 176 sits.

As seen in FIGS. VII and VIII, the pressure plate 176 is provided with six inclined ramps on its inboard face, in which six hardened steel balls are carried. Similar inclined ramps are machined in its outboard face of the primary input toroid 116 and provide a means whereby preload on the toroidal primary device automatically adjusts to the torque being applied.

Again at FIGS. V and VI, minimum preload is maintained by means of a nut 132 acting on a Belleville washer 178 which in turn acts on pressure plate 176. Maximum preload occurs with maximum torque to inhibit slippage within the primary traction drive mechanism. Thus, the primary input toroid 116, having a race 117, is driven through the pressure plate and the torque-sensitive device and in turn drives primary rollers 120 carried on shafts 122, which are supported in roller carriers 124 and which are free to pivot between centers of bosses cast in the inner diameter of cage 115. A change in the inclination of the primary roller shafts thus changes the inclination of the rollers resulting in an increase or decrease of the speed ratio. The primary output toroid 126 which is retained axially by means of angular contact bearing 134 also incorporates the outer ring of the planetary gear system which constitutes the secondary, fixed ratio, drive to the output shaft 130. The outer ring gear 136 drives the three planet gears 128 to the output shaft 130. The planet gears 128 are connected to stationary cage 115 by means of pins 131, about which pins each of the gears, which are mounted on ball bearings, may freely rotate.

The output shaft 130 drives the hub 138 through a freewheel device 140.

Changing the speed ratio is achieved by varying the inclination of the primary roller shaft 122. The outer extremity 142 of each shaft 122 rides in a respective axial slot 119 cut in the cage 115. The speed changer 144 is in the form of a drum which can be rotated by the rider rotating the speed changing mechanism barrel 92 thereby pulling one of the ends of cable 46 forward and thereby rotating drum which is supported by polytetrafluoroethylene (PTFE) or nylon rings 146 and 147 about the cage 115. Rotation of the drum is actuated by Bowden cables acting on the lugs 148, which are attached to the flange on the drum 144. Diagonal slots 145 are cut at an angle of 75° to the axis around the circumference of the drum. The primary roller shafts 122 ride in the slots 145. Rotation of the drum causes the outer end 142 of each shaft 122 to move axially along the slot 119 in the cage 115, thus changing the position of primary rollers 120 in the toroidal races, hence changing the speed ratio of the primary drive. Outer bearing 150 is a press-fit in hub 138 and is supported on drum 144.

For the bicycle application envisaged, the secondary planetary drive provides a fixed ratio speed increase of 2.5:1. The variable primary drive permits a change in ratio 2.3:1, hence providing, through compounding, an exceptionally wide useable speed range. Three primary traction rollers 120 and three secondary planetary gears 128 positioned equally around the circumference of the primary toroids 120,126 and secondary drive (outer ring 126 and output shaft 130), respectively, are also considered appropriate. Final output ratios and the number of primary rollers and secondary gears can be varied to match required speed and torque conditions. The transmission is specifically designed so that the direction of rotation of the output shaft (i.e. the hub), is the same as that of the input shaft.

The design of this unit facilitates the manufacture of its principle elements from a variety of engineering materials appropriate for performance and cost considerations. The primary toroids, for example, are particularly suitable for manufacture from powdered metal, the cage 115 and cover plate 110 from reinforced molded plastic, thus significantly reducing weight.

Thus it will be apparent that the significant features of the continuously variable compound traction drive transmission described above are:

1. Primary roller is independently loaded axially in recognition of different torque/load requirements in the primary system and which, in addition, vary with speed selected;

2. The live axle input shaft and the output shaft are coaxial and concentric, input torque is applied at both ends of the input shaft and output is through a flanged hub which rotates in the same direction as the input shaft;

3. Design of the output shaft which carries the hub through a freewheel device provides it with positive axial location;

4. Inclination of primary rollers is achieved outboard of their axis of inclination in order to provide the maximum moment arm and thus to minimize load and wear on the roller shaft and adjusting drum;

5. The speed change drum, which has inclined slots which carry the rollers shafts, is positively located axially by the hub and external bearing and the cage end plate and supporting ring;

6. Minimum preload on the primary roller assembly is provided by means of a Belleville washer abutting against an adjustment nut, which itself is provided with a locking device in the form of a keyed tab washer. The preferred embodiment provides for the simultaneous application of torque and axial load on the primary roller system by means of a cam having a series of circulating balls riding on inclined ramps machined in the outer face of the primary input toroid and on a keyed pressure plate having similar ramps as described in FIGS. VII and VIII;

7. Stepless speed changing is achieved by means of Bowden cables attached to the lugs mounted on the flange of the speed change drum and leading through the frame of the bicycle to a twist-grip speed change control affixed to the handlebars. The simplicity of the three piece design of the twist grip speed control permits low cost manufacture and ease of assembly onto handlebars of virtually any configuration, as well as extreme convenience of operation.

Such a transmission, while particularly appropriate for the subject racing bicycle of my invention is also quite suitable for light duty industrial applications.

The assembly procedure for the traction transmission is as follows:

1. Insert angular contact bearing 134 into housing of primary output toroid 126;

2. Assemble output toroid 126 on main input shaft 118 being sure bearing fits snug against collar;

3. Insert 2 of the 3 secondary gear studs or pins 131 into holes 139 in cage end plate 114;

4. With cage end plate flanged side uppermost, fit 2 of the three spacer bushings 156 over studs or pins 131;

5. Press fit small ball bearings into secondary planet gears 128;

6. Place 2 of the 3 secondary planet gears onto the two pins 131 mounted on the cage end plate and fasten with circlips;

7. Locate output shaft 130 close up to the two positioned gears, with gears in mesh;

8. Place third bushing 156 over remaining hole in end plate and the third secondary gears 128 on top of it and close up against the output shaft so that gears are in mesh;

9. Insert third gear pin through end plate, bushing, bearing and fasten with circlip;

10. Assemble output shaft 130 onto main input shaft 118, positioning balls 162 in ball retainer ring 164 and locking with circlip 166.

11. Insert angular contact bearing 134 into housing in output toroid 126. Slide over input shaft until bearing 134 fits snug against collar 168 on input shaft and gears are in mesh;

12. Prepare the 3 primary roller sub assemblies by inserting the 3 ball bearings into the housings in primary rollers 120;

13. Place washers each side of bearings and fit the rollers into the slots in the primary roller carriers 124. Insert shafts 122 through roller carriers, washers, bearings and fasten with circlips;

14. Place PTFE or nylon bushing 146 over outer diameter of cage or main body 115, approximately ½ inch closer to end plate end of cage than its final position;

15. Insert cage into speed change drum 144 so that cage projects ½ inch beyond speed change drum flanged end;

16. Bond second PTFE or nylon bushing 147 onto raised portion of cage;

17. Rotate speed change drum until end of slot closest to the flange lines up with slot in main body of cage;

18. Position each of the primary roller sub assemblies in turn into the main body of cage, using 1/16 inch thick nylon washers at each end of carrier against the bosses in the cage inner wall. Roller shafts 122 should project through slots in cage and speed change drum;

19. Insert studs through bosses in cage, washers and into roller carriers. Do not over tighten, carriers should be free to rotate easily on studs. Lock studs using minimum amount of Loctite adhesive or other suitable adhesive on threads only, being sure not to get any adhesive on unthreaded portion of stud;

20. Rotate speed change drum while sliding forward onto bushing 147. Position the other bushing 146 under and snug against plain end of speed change drum;

21. With speed change drum rotated to a position where the three primary roller shafts 122 are perpendicular to the main shaft 118, place main cage sub-assembly into position so that the bushing 146 fits tight against the flanged end plate 114 and the primary rollers are in contact with the face of the output side of the primary toroid. Rotate cage sub-assembly until holes in cage line up with holes in cage end plate flange;

22. Using toothed washers and flat head machine screws 158, locked with Loctite adhesive, fasten cage and end plate together firmly;

23. Slide primary input toroid 116 over splines on main shaft;

24. With main shaft vertical place balls 172 on machined ramps in outboard face of primary toroid 116. With tang 175 in pressure plate 176 located in keyway 174 rest pressure plate 176 on top of balls 172;

25. Fit Belleville washer 178 against face of pressure plate 176;

26. Fit keyed tab washer 180 next to Belleville washer 178;

27. Place locknut 132 over shaft 118 and tighten to take up slack, being sure that all primary roller shafts are in the same position relative to the main shaft axis;

28. With primary roller shafts perpendicular to the main shaft; tighten primary toroid lock-nut 132 to preload primary drive;

29. Insert bearing 152 into cover plate housing 110. Thinly coat contact faces of cover plate and end face of cage with sealing compound;

30. Place bearing over main shaft and position cover plate so that holes line up with holes in end face of cage. Fasten tightly with CSK machine screws 170 and lock with adhesive;

31. Insert large diameter sealed bearing 150 into hub 138;

32. With clamp ring 184 positioned on the inboard side of the free-wheel 140 unit, screw on flanged free wheel unit onto threaded output shaft. Tighten. Thinly coat flange with liquid gasket;

33. Thinly coat bearing land on speed change drum with sealing compound;

34. Slide hub over speed change drum until bearing sits correctly in position, and hub end face fits snug against flange on freewheel unit. Rotate hub until holes in hub end face line up with holes in flange and clamp ring 184 of freewheel unit. Fasten firmly with 8 machine screws 160 and lock washers;

35. Screw lug 112 (shoulder screw) firmly into cover plate 110;

36. Carefully insert seal 186 into housing in freewheel unit 140;

37. Fit remaining sealed bearing 152 onto shoulder of main shaft;

38. With screw plug 182 in outer shell of hub removed, half fill unit with Monsanto "Santotrac˙ 70" traction fluid. Replace plug and checks for leaks; and 39. With bearing 152 and cover plate 110 held firmly, rotate main shaft to ensure there is positive traction with no slip. Slowly rotate speed change drum *while turning main shaft.* Check to ensure smooth operation of speed changer. Note speed ratio can *not* be changed while main input shaft is stationary.

Thus have I described a new, streamlined bicycle including a novel frame and traction drive transmission to provide the above described numerous advantages over previous bicycle designs. Among these, it will be apparent that the rider, located in a recumbent position upon the cycle, will be comfortably arranged in a prone, swimmers position, thus offering significantly less wind resistance. Further all force from the riders legs to the pedal crank and driving mechanism of the rear wheel assembly is in a straight line with his spinal system, thereby significantly reducing back strain and increasing the efficiency of the drive due to the elimination of the usual chain and sprocket drive arrangement. Also, the speed ratio of the driven rear wheel assembly is continuously and infinitely, over a set range, adjustable through the combination of a unique speed change device coupled with a compound traction drive transmission. It should be appreciated that modifications to the preferred embodient described herein may be made by those of ordinary skill in the art and implementing the teachings of the present invention. Accordingly, the description herein for the preferred embodiment should not be construed as a limitation upon the present invention. Rather the invention should be interpreted in accordance with the appended claims.

I claim:

1. A streamlined bicycle especially adapted for racing purposes, comprising:

a steerable front wheel assembly including a front wheel;

a rear wheel assembly including a rear wheel and axle;

an elongated frame having a front end to which is connected the front wheel assembly and having a rear end to which is connected the rear wheel assembly;

the frame including means for supporting a rider in a head-forward, recumbent position over the frame;

a rotary pedal assembly located at the rear portion of the frame so that the pedals are engaged by the feet of the rider when in said recumbent position;

power transmission means for transmitting power from the pedal assembly to the rear wheel assembly to propel the bicycle;

said power transmission means being located within and constituting a portion of said rear wheel assembly;

said rear wheel assembly including a hub and said power transmission means being sealingly encapsulated within said hub;

said pedal assembly including an input shaft concentric with said hub and constituting the axis of rotation for said hub and means for driving said power transmission means, pedal crank member being located at opposite ends of said input shaft whereby the power transmission means is directly driven by the rider rotating the pedal assembly; and said power transmission means including a continuously variable compound traction drive transmission whereby over a set speed ratio range the output speed at the rear wheel may be infinitely varied while the rider maintains a constant speed at the pedal assembly.

2. The bicycle of claim 1 wherein:

said power transmission including in combination an input shaft, an output shaft, a primary traction drive system and a secondary drive system, and a cage encapsulating said combination, and said input shaft being concentric with said rear wheel assembly and extending throughout the axial extent of said rear wheel assembly and adapted to receive a rotary input force at either end thereof from said pedal assembly.

3. The bicycle of claim 2 wherein:

said primary traction drive system including an input toroid having a drive torodial race, an output toroid having a driven torodial race, and traction roller means between and engaging said races for transmitting power to the output toroid, and speed adjustment means for adjusting the position of said traction roller means relative to said races and thereby vary the speed ratio between said races; and said output toroid being fixed to said secondary drive system, and said secondary drive system having a fixed drive ratio.

4. The bicycle of claim 3 wherein:

said traction roller means comprising at least one roller, said roller being rotatably mounted on a roller carrier, said speed adjustment means including means for fixing the ends of said roller carrier such that it may be at least partially rotated about an axis perpendicular to the axis of rotation of said roller; and said speed adjustment means further including a lever fixed to said carrier, means carried on said cage for causing limited movement of said lever about the axis of said roller carrier whereby the relative angle of inclination between said roller and the said drive and driven race may be infinitely varied within fixed limits to thereby permit a continuously variable drive ratio within said primary traction drive system.

5. The bicycle of claim 3 wherein:

said secondary drive system comprising a planetary gear unit including a ring gear having a drive race, a sun gear having a driven race, and a planetary set of gears therebetween for transferring drive therethrough at a fixed drive ratio, said sun gear being said output shaft, and said output shaft being fixed to said hub for driving said rear wheel assembly; and said output toroid of said primary traction drive system and said ring gear of said secondary drive system being a single, integral unit.

6. A streamlined, two-wheeled bicycle, comprising:

a steerable front wheel assembly including a front wheel;

a rear wheel assembly including a rear wheel and axle;

an elongated frame having a front end to which is connected the front wheel assembly and having a rear end to which is connected the rear wheel assembly;

said frame consisting of a front frame member having said front end and a rear frame member having said rear end, each said frame member being in the general shape of an elongated tube, one such frame member having an end portion telescopically received relative to the other frame member and frame locking means for fixedly adjusting the frame members together thereby allowing one to adjust at will the overall length of the bicycle;

support means mounted on said frame for supporting a rider in a head-forward, recumbent position over the frame, said support means comprising a body support fixed to and extending upwardly of said frame, said body support including a body support frame and a hinge means at the lower end thereof for hingedly securing the body support to the bicycle frame, said body support lying transversely of the bicycle frame and further including a rest extending transversely of and resting upon the bicycle frame thereby holding the upper end of the body support off the bicycle frame when the cyclist is supported thereon in a recumbent position;

a pedal assembly located at the rear portion of the frame so that the pedals are engaged by the feet of the rider when in said recumbent position;

means for transmitting power from said pedal assembly to said rear wheel assembly to propel the bicycle;

said power transmitting means being solely within and constituting a portion of said rear wheel assembly.

7. The bicycle of claim 6 wherein said end portion of said frame member includes a series of spaced holes along the axial extent of said end portion and extending transversely of the longitudinal axis of said end portion, and said other frame member also including at least a single hole extending transversely of the longitudinal axis of said other frame member and aligned with one of said series of spaced holes, said frame locking means extending through at least one pair of said transversely aligned holes in telescoping portions of each said frame member for locking said frame members together.

8. The bicycle of claim 7 wherein said frame locking means includes a locking pin, said locking pin extending through each said frame member such that each end of the locking pin projects outwardly therefrom, each locking pin end including means for holding the locking pin in place.

9. The bicycle of claim 8 wherein said hinge means for the body support includes a single hinge pin located transversely of each said frame member and about which the body support may swing in alignment with each said frame member until arrested thereby; said single hinge pin and said locking pin being the same pin.

10. The bicycle of claim 6 wherein said body support frame is generally V-shaped as viewed in a plane perpendicular to the axis of said frame members and semi-resilient under the weight of the cyclist;
at least one body support pad connected to said body support at the upper end portions thereof, and said rest being located between said at least one body support pad and said hinge means.

11. The bicycle of claim 6 wherein said frame locking means includes said single securement means for said body support.

12. A streamlined bicycle especially adapted for racing purposes, comprising:
a steerable front wheel assembly including a front wheel;
a rear wheel assembly including a rear wheel and axle;
an elongated frame having a front end to which is connected the front wheel assembly and having a rear end to which is connected the rear wheel assembly;
the frame including means for supporting a rider in a head-forward, recumbent position over the frame;
a rotary pedal assembly located at the rear portion of the frame so that the pedals are engaged by the feet of the rider when in said recumbent position;
power transmission means for transmitting power from the pedal assembly to rear wheel assembly to propel the bicycle;
said power transmission means being located within and constituting a portion of said rear wheel assembly;
said rear wheel assembly including a hub and said power transmission means being sealingly encapsulated within said hub;
said power transmission means including a continuously variable compound traction drive transmission whereby over a set speed ratio range the output speed at the rear wheel may be infinitely varied while the cyclist maintains a constant speed at the pedal assembly;
said power transmission including in combination an input shaft, an output shaft, a primary traction drive system and a secondary drive system, and a cage encapsulating said combination;
said input shaft being concentric with said rear wheel assembly and extending throughout the axial extent of said rear wheel assembly and adapted to receive a rotary input force at either end thereof from said pedal assembly;
said primary traction drive system including an input toroid having a drive torodial race, an output toroid having a driven torodial race, and traction roller means between and engaging said races for transmitting power to the output toroid, and speed adjustment means for adjusting the position of said traction roller means relative to said races and thereby vary the speed ratio between said races;
said output toroid being fixed to said secondary drive system, and said secondary drive system having a fixed drive ratio; and
said speed adjustment means further including a drum concentrically mounted on said cage, actuating means connected to said drum for rotating said drum relative to said cage, said drum including a slot extending diagonally to the axis of rotation of said drum, said cage including a slot extending axially to the axis of rotation of said cage.

13. The bicycle of claim 12 wherein:
said lever extends from said roller carrier through each of said slots whereby upon rotation of said drum relative to said cage the angle of inclination of said roller will cause a change in the speed ratio of the primary traction drive system.

14. A continuously variable compound light duty traction drive transmission adapted for use in a bicycle or similar light duty, low torque applications comprising:
in combination an input shaft, an output shaft, a primary traction drive system and a secondary drive system, and a cage encapsulating said combination; and
said input shaft being concentric with said output shaft and said cage adapted to receive a rotary input force at either end thereof;
said primary traction drive system including an input toroid having a drive torodial race, an output toroid having a driven torodial race, and traction roller means between and engaging said races for transmitting power to the output toroid, and speed adjustment means for adjusting the position of said traction roller means relative to said races and thereby vary the speed ratio between said races;
said speed adjustment means further including a drum concentrically mounted on said cage, actuating means connected to said drum for rotating said drum relative to said cage, said drum including a slot extending diagonally to the axis of rotation of said drum, said cage including a slot extending axially to the axis of rotation of said cage, and means riding within said slots and connected to said traction roller means whereby upon rotation of said drum the angular position of the traction roller means relative to the input and output toroid will be changed.

15. The continuously variable compound light duty traction drive transmission of claim 14 wherein:
said traction roller means comprises at least one roller, said roller being rotatably mounted on a roller carrier, said speed adjustment means including means for fixing the ends of said roller carrier such that it may be at least partially rotated about an axis perpendicular to the axis of rotation of said roller;

said means comprising a lever extending from said roller carrier through each of said slots whereby upon rotation of said drum relative to said cage the angle of inclination of said roller will cause a change in the speed ratio of the primary traction drive system.

16. A continuously variable compound light duty traction drive transmission adapted for use in a bicycle or similar light duty, low torque applications comprising:

in combination an input shaft, an output shaft, a primary traction drive system and a secondary drive system, and a cage encapsulating said combination; and said input shaft being concentric with said output shaft and said cage adapted to receive a rotary input force at either end thereof;

said primary traction drive system including an input toroid having a drive torodial race, an output toroid having a driven torodial race, and traction roller means between and engaging said races for transmitting power to the output toroid, and speed adjustment means for adjusting the position of said traction roller means relative to said races and thereby vary the speed ratio between said races;

said secondary traction drive system comprising a planetary gear unit including a ring gear having a drive race, a sun gear having a driven race, and a planetary set of gears therebetween for transferring drive therethrough at a fixed drive ratio, said output toroid of said primary traction drive system being fixed to said ring gear, and said sun gear being said output shaft, and said output shaft being fixed to said hub for driving said rear wheel assembly or the like.

17. The light duty traction drive transmission of claim 16 wherein:

said speed adjustment means further including a drum concentrically mounted on said cage, actuating means connected to said drum for rotating said drum relative to said cage, said drum including a slot extending diagonally to the axis of rotation of said drum, said cage including a slot extending axially to the axis of rotation of said cage.

18. The light duty traction drive tranmission of claim 16 wherein:

said traction roller means comprises at least one roller, said roller being rotatably mounted on a roller carrier, said speed adjustment means including means for fixing the ends of said roller carrier such that it may be at least partially rotated about an axis perpendicular to the axis of rotation of said roller; and said speed adjustment means further including a lever fixed to said carrier, means carried on said cage for causing limited movement of said lever about the axis of said roller carrier whereby the relative angle of inclination between said roller and the said drive and driven race may be infinitely varied within fixed limits to thereby permit a continuously variable drive ratio within said primary traction drive system.

19. The light duty traction drive transmission of claim 18 wherein:

said speed adjustment means further including a drum concentrically mounted on said cage, actuating means connected to said drum for rotating said drum relative to said cage, said drum including a slot extending diagonally to the axis of rotation of said drum, said cage including a slot extending axially to the axis of rotation of said cage; and said lever extending from said roller carrier through each of said slots whereby upon rotation of said drum relative to said cage the angle of inclination of said roller will cause a change in the speed ratio of the primary traction drive system.

20. The continuously variable compound light duty traction drive transmission of claim 16 wherein:

said output toroid of said primary traction drive system and said ring gear of said secondary drive system are a single, integral unit.

* * * * *